Patented Feb. 3, 1948

2,435,499

UNITED STATES PATENT OFFICE 2,435,499

PARASITICIDAL PREPARATIONS

Elbert C. Ladd, Passaic, N. J., assignor to United States Rubber Company, New York, N. Y., a corporation of New Jersey No Drawing. Application April 14, 1944,
Serial No. 531,123

8 Claims. (Cl. 167—32)

This invention relates to new and useful improvements in parasiticidal preparations, more particularly to germicides, that it, fungicides and bactericides, and to insecticides, the latter term being considered to include larvicides and arachnicides, as well as insectifuges and larvifuges. It also relates to plant growth regulator compositions. The invention further relates to methods of protecting organic material subject to attack by micro-organisms, as in the immunizing of seed, and the mildewproofing of fabrics and other material.

I have found that 2,3-dichloro-2,3-dihydro-1,4-naphthalenedione is an effective germicide and insecticide. The structure of the compound may be represented as follows:

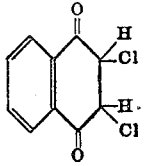

The compound and method of making it are described by Zincke and Schmidt in Beilstein's "Handbuch der Organischen Chemie." volume 7, page 702, 4th edition. It is there called 2,3-dichloro-1,4-dioxo-naphthalenetetrahydride-1,2,3,4. It has also been called $\beta^1,\beta^2$-dichloro-$\alpha^1,\alpha^2$-diketo-tetrahydronaphthalene.

The 2,3-dichloro-2,3-dihydro-1,4-naphthalenedione may be used as a seed protectant and to protect plants or soil from organisms harmful to seeds and plants. It may also be applied to prevent or retard fungus growth and the formation of, for example, mildew on organic material, such as rope, wood, fur, hair, feathers, cotton, wood, leather, paints, rubber, rubberized or synthetic resin-coated fabrics, and the like. The 2,3-dichloro-2,3-dihydro-1,4-naphthalenedione may be applied as dust, or sprays, or in solution in a suitable solvent, or suspended in a suitable non-solvent medium, for example, water. It may be applied undiluted or diluted, or mixed with carriers, fungicides, bactericides, insecticides, insect repellents, fertilizers, hormones, or buffering agents. It may be applied to the plant as a plant growth regulator. It may be applied in the manners above described to seeds to stimualte germination, or root or plumule development. It may be applied to growing plants to improve general plant growth or to increase the yield of tubers, fruit, or vegetable seed. It may be applied to cuttings to stimulate root development and to induce new root formation on cuttings normally difficult to root.

The following examples are given to illustrate the invention:

Example I

Pea seed, variety Perfection, were tumbled with 1% by weight of the 2,3-dichloro-2,3-dihydro-1,4-naphthalenedione in dust form. The seeds were then planted in soil known to be infested with a number of organisms including *Pythium ultimum*. The effectiveness of the chemical as a fungicide was determined by comparing the number of treated and untreated seeds which germinated and developed into healthy plants from equal numbers of treated and untreated seeds planted under the same conditions. Observations made at the end of ten days showed that 85% of the treated seeds had germinated and grown to healthy seedlings, whereas only 39% of the untreated seeds had germinated. Both the untreated seeds and the seedlings which developed from them were observed to be infected with *Pythium ultimum* which had caused them to rot, whereas the seeds and seedlings which were treated with 2,3 - dichloro - 2,3-dihydro-1,4-naphthalenedione were found to be free of this disease.

Example II

This case illustrates the effectiveness of 2,3-dichloro-2,3-dihydro - 1,4 - naphthalenedione as a bactericide. 1% by weight of 2,3-dichloro-2,3-dihydro-1,4-naphthalenedione was suspended in water which contained 2% of a commercial dispersing agent (believed to be the reaction product of a fatty acid or fatty acid ester with ethylene oxide.) A section of potato was immersed in this suspension and allowed to stand at room temperature. No growth of naturally occurring bacteria was observed after thirty days. On the other hand, a section of potato treated in a similar manner with a 2% solution of the above dispersing agent in water, which solution did not contain a germicide, became heavily overgrown with naturally occurring bacteria within the same period of time.

Example III

The insecticidal properties of 2,3-dichloro-2,3-dihydro-1,4-naphthalenedione are shown by the following test. A quantity of pea seed infested with pea weevils was dusted with .63% by weight of 2,3-dichloro-2,3-dihydro-1,4 - naphthalenedione and placed in an open jar. Escape of the weevils was prevented by covering the mouth of the jar with gauze. After two weeks it was observed that all the weevils were dead. No mortality was observed in weevil-infested untreated seed stored under the same conditions at the same time.

*Example IV*

The repellent and insecticidal properties of 2,3-dichloro-2,3-dihydro-1,4-naphthalenedione are shown by the following test. Four pieces of woolen cloth 1½" x 4" were immersed in a 5% solution by weight of the chemical in acetone until saturated with the solution, then removed and air-dried to remove the solvent. Each sample was then placed in a covered Petri dish containing five black carpet beetle larvae and allowed to stand at room temperature for four weeks. Four similar pieces of untreated woolen cloth were placed in separate Petri dishes each containing five black carpet beetle larvae and allowed to stand for four weeks under equal conditions. At the end of this period it was observed that no feeding had occurred on the treated samples, whereas very heavy feeding had occurred on the untreated samples. Furthermore, 80% of the larvae exposed to the treated samples were dead, whereas there was no mortality in the larvae exposed to the untreated samples.

*Example V*

The insect repellent properties of 2,3-dichloro-2,3-dihydro-1,4-naphthalenedione are further shown in the following:

Two young bean plants, the first true leaves fully expanded, were sprayer with a ½% aqueous emulsion of 2,3-dichloro-2,3-dihydro-1,4-naphthalenedione containing .15% of proprietary wetting and emulsifying agents. The plants were then placed in an insect cage and infested with ten Mexican bean beetle larvae. After seven days, it was observed that only 25% of the leaves had been consumed by the insects. Leaves of untreated plants and of plants sprayed only with a solution of the wetting and emulsifying agents in water but containing none of the chemical, and similarly infested with Mexican bean beetle larvae, were completely skeletonized in the same period of time.

*Example VI*

The following illustrates the use of 2,3-dichloro-2,3-dihydro-1,4-naphthalenedione as a plant growth regulator. Geranium cuttings of the variety Ricard were placed in distilled water containing 2,3-dichloro-2,3-dihydro-1,4-naphthalenedione at various concentrations (including zero), fifteen cuttings being used at each concentration. The cuttings were allowed to remain in these aqueous media for a period of 3½ hours, after which they were placed in clean sand to root. After ten days the cuttings were lifted and observations made, each cutting being scored as not rooted, lightly rooted, medium rooted, and heavily rooted. The results are shown in the following table:

| Parts of 2,3-dichloro-2,3-dihydro-1,4-naphthalenedione per million parts of water | Number of Plants | | | |
|---|---|---|---|---|
| | Not Rooted | Lightly Rooted | Medium Rooted | Heavily Rooted |
| 100 | 11 | 4 | 0 | 0 |
| 31 | 3 | 3 | 1 | 8 |
| 10 | 12 | 0 | 3 | 0 |
| 3 | 12 | 1 | 2 | 0 |
| None (control) | 13 | 0 | 2 | 0 |

The above data show that 2,3-dichloro-2,3-dihydro-1,4-naphthalenedione is an effective plant growth regulator.

Having thus described my invention, what I claim and desire to protect by Letters Patent is:

1. A fungicidal composition comprising an aqueous suspension of 2,3-dichloro-2,3-dihydro-1,4-naphthalenedione containing a dispersing agent.

2. The method of protecting organic material subject to attack by microorganisms which comprises treating said organic material with 2,3-dichloro-2,3-dihydro-1,4-naphthalenedione.

3. The method of protecting seeds, plants and soil subject to attack by fungi, bacteria and insects which comprises treating said material with 2,3-dichloro-2,3-dihydro-1,4-naphthalenedione.

4. The method of immunizing seeds which comprises treating said seeds with 2,3-dichloro-2,3-dihydro-1,4-naphthalenedione.

5. The method of stimulating plant growth which comprises treating plants with 2,3-dichloro-2,3-dihydro-1,4-naphthalenedione.

6. In the propagation of plants, the method altering the growth characteristics of the plant which comprises treating the plant with 2,3-dichloro-2,3-dihydro-1,4-naphthalenedione.

7. The improvements in propagating plants from cuttings and the like which comprises subjecting the cuttings to the action of 2,3-dichloro-2,3-dihydro-1,4-naphthalenedione.

8. The method of controlling insects which comprises treating the insects with 2,3-dichloro-2,3-dihydro-1,4-naphthalenedione.

ELBERT C. LADD.

REFERENCES CITED

The following references are of record in the file of this patent:

UNITED STATES PATENTS

| Number | Name | Date |
|---|---|---|
| 1,970,163 | Brandus | Aug. 14, 1934 |
| 2,169,549 | Zimmerman et al. | Aug. 15, 1939 |
| 2,349,772 | Ter Horst | May 23, 1944 |

OTHER REFERENCES

Beilstein, vol. 7, 4th edition, page 702.